Patented Jan. 12, 1954

2,666,085

UNITED STATES PATENT OFFICE 2,666,085

ISOMERIZATION OF DICHLOROBENZENES

John T. Fitzpatrick, Charleston, W. Va., assignor to Union Carbide and Carbon Corporation, a corporation of New York No Drawing. Application September 29, 1950, Serial No. 187,683

14 Claims. (Cl. 260—650)

The present invention relates to a novel process for the production of meta-dichlorobenzene, and it has especial utility for the production of meta-dichlorobenzene directly from ortho- or para-dichlorobenzene, or from dichlorobenzene mixtures containing them, with higher yields of the meta isomer than are obtainable by processes used heretofore.

Meta-dichlorobenzene, either in the pure state or in mixtures with the other isomers, has utility as an intermediate in the production of various compounds not readily producible by other known methods. Its hydrolysis to produce meta-chlorophenol is readily accomplished; and further hydrolysis to resorcinol is possible. These compounds in turn are useful for the production of synthetic resins, explosives and various dyestuff intermediates.

For many of these uses dichlorobenzenes only fairly high in meta content can be used. In the hydrolysis the meta isomer reacts faster than either of the other two so that the product is richer in the meta isomer than the starting material. The mixtures of isomers are particularly useful for making meta-chlorophenol and resorcinol for use in synthetic resin manufacture.

The ortho- and para-dichlorobenzenes are readily prepared by the chlorination of benzene. However, such procedures yield very little of the meta isomer. The latter has been available only through a complicated series of reactions at high cost. Mouneyrat and Pouret (Compt. rend. 127, 1025–27) described work on the chlorination of monochlorobenzene in the presence of anhydrous aluminum chloride which acts as a chlorinating agent. They reported securing a mixture of isomeric dichlorobenzenes of which about 18% was the meta isomer. However, Holleman and van der Linden (Rec. trav. chem., 30, 305–80) (1911), following Mouneyrate et al.'s teachings, found less than one-third of this yield of the meta isomer under similar conditions, and showed that Mouneyrat et al. could not have had as much of the meta isomer as they reported.

This invention is based in part upon the discovery that either the ortho or the para isomer of dichlorobenzenes, or mixtures of dichlorobenzenes containing them, can be isomerized and converted to the meta isomer with good yields by treatment thereof with aluminum chloride and water as hereinafter described. The yield of meta isomer is often as high as 47% per pass, and the loss to products other than dichlorobenzenes is very small. In particular there is almost no disproportionation which would be expected to accompany such an isomerization and which Friedel and Crafts (Ann. Chem. phys. (6) 10, 411–424) reported as taking place in the methylation of ortho-dichlorobenzene.

In accordance with one preferred modification of the invention, a quantity of ortho- or of para-dichlorobenzene, or a mixture of these isomers, which may contain some of the meta isomer, has added thereto suitable amounts of aluminum chloride and water, and this mixture is gradually heated from room temperature to at least 120° C. and advantageously to from 130° C. to the refluxing temperature, over a period commonly around 1 to 5 hours or more. Heating with or without refluxing may be continued for 0.5 hour or more, but the reaction is substantially complete when the refluxing temperature is reached. During the time of heating to 120° C. or above the aluminum chloride and water apparently react to form a basic aluminum chloride and hydrogen chloride, the latter of which escapes throughout the reaction period. To secure the maximum conversion to the meta isomer, the rate of heating should not be too fast.

The reaction mixture from the isomerization preferably then is neutralized with an alkaline compound such as an alkali metal hydroxide, alkaline earth metal hydroxide or the like to neutralize and destroy the aluminum chloride or basic chloride present. The mixture stratifies on standing, and the organic layer is separated, washed with water, dried over calcium chloride or the equivalent, and filtered. The entire filtrate preferably is distilled under vacuum until the kettle is substantially dry. By a fractional distillation of the total distillate under high vacuum or under atmospheric pressure with a highly efficient column still the meta content of the dichlorobenzene mixture can be increased to 80% or higher, depending upon the ratio of meta to para isomer in the product. The meta and para isomers form a eutectic mixture consisting of 85%–90% of the meta isomer. Upon cooling a mixture of these isomers containing more than this amount of the meta, the excess meta isomer crystallizes out until the eutectic composition is reached.

The para- and meta-dichlorobenzenes can be separated in a manner similar to that described for the dibromobenzenes in Bull. soc. chim. (2) 48, 210–216.

If desired, the catalyst can be removed from the reaction mixture from the isomerization by repeated washing with water, without the use of any alkali. The drying and filtration steps are advantageous but not essential. Moreover, the preliminary distillation of the filtrate can be omitted; and the fractional distillation can be carried out directly upon the water-washed isomerization reaction mixture.

The weight ratio of the aluminum chloride to the dichlorobenzene being reacted is not critical. Usually about 10% of the catalyst, by weight, based upon the dichlorobenzene, gives effective results, and 15% can advantageously be used. There is little advantage in adding larger amounts since the equilibrium concentrations of the isomers are approached when using around 10% of catalyst. Smaller amounts of the catalyst, e. g., 2%, give correspondingly smaller conversions to the meta isomer.

The mixture of reactants should contain water in amount sufficient to form a substantial quantity of a basic aluminum chloride. A few per cent by weight of water, e. g., 3%, based upon the dry weight of the aluminum chloride, can be used. It is preferred, however, to use larger proportions of water; and equally good conversions have been secured using around 8% and around 16% of water, based upon the weight of the aluminum chloride. Larger amounts of water, e. g., 25%–27%, can be used, but give less complete isomerization.

Preferably the ortho- or para-dichlorobenzene used as starting material should be free from traces of impurities that have a deleterious effect upon the reaction. Samples of commercial ortho-dichlorobenzenes tested have shown varying amounts of some unknown impurity which tends to inhibit the isomerization. In many instances the degree of inhibition is relatively slight, and the material can be used in the process without pretreatment, with some sacrifice in conversion secured. In other instances the isomerization is almost completely prevented. Although the nature of the impurity is not known, it has been discovered that it can be eliminated by heating and preferably refluxing the dichlorobenzene starting material with a small amount of concentrated sulfuric acid, e. g., 5% or more, or with 1% to 2% or more of a Friedel-Crafts type catalyst, such as the halides of aluminum, zinc, boron and iron, e. g., anhydrous aluminum chloride, for from 20 minutes to an hour or more, followed by distillation of the dichlorobenzene. While this treatment effects very little isomerization, the treated material is much more readily isomerized by the subsequent treatment with aluminum chloride and water in accordance with this invention. The impurity removed apparently is a color-forming unsaturated material, since pretreated dichlorobenzene develops much less color during the isomerization than do ordinary commercial grades. The ortho isomer recovered from the isomerization of a dichlorobenzene according to this invention can be used as starting material for a subsequent isomerization without the need for any pretreatment.

It is preferred to use the ortho-dichlorobenzene for the production of the meta isomer since it is less costly than the para isomer and is more readily separated from the meta isomer. When starting with the ortho isomer some of the para isomer also is produced. The weight ratio of meta to para isomers thus produced varies with the extent of conversion, commonly ranging from 20:1 when the conversion is around 10% to around 2:1 when the conversion is around 70%. Repeated treatments of the same material by the process without separation of the isomers give an equilibrium mixture containing about 50% of the meta, about 25% of the ortho and about 25% of the para isomers. Since the meta and para isomers boil at about the same temperature, while the ortho isomer boils somewhat higher, a low conversion permits recovery by vacuum distillation of a purer meta isomer than does a high conversion. The amount of disproportionation to mono- and trichlorobenzenes is about 1% when a high conversion is secured, and is much lower at low conversions.

The following examples serve to illustrate the invention. In the examples the parts are given in terms of weight unless otherwise indicated.

Example 1

Into a flask fitted with an agitator, and a reflux condenser were placed 600 parts of redistilled commercial ortho-dichlorobenzene, 60 parts of anhydrous aluminum chloride and 5 parts of water. The mixture was gradually heated, over a period of 2.5 hours, to the refluxing temperature, 176° C., where it was held for 0.5 hour. The reaction mixture then was cooled and poured into an approximately 10% aqueous solution of sodium hydroxide in amount sufficient to convert the aluminum compound to soluble sodium aluminate. Upon settling, the organic layer was separated, washed with water, dried over calcium chloride and filtered. The filtrate was distilled under a pressure of 40 millimeters of mercury, and the total distillate, which boiled in the range 85° C.–87° C., contained 89% of ortho-, 10% meta- and 1% para-dichlorobenzene as shown on analysis by infra-red absorption.

Example 2

During 2 hours a mixture of 700 parts of the ortho-dichlorobenzene described in Example 1 and 7 parts of anhydrous aluminum chloride was refluxed. The reaction mixture then was cooled and worked up in the manner described in Example 1 to destroy the catalyst and recover the dichlorobenzene. The resultant product was essentially the unchanged ortho isomer.

A mixture of 600 parts of this pretreated ortho-dichlorobenzene, 60 parts of aluminum chloride, and 5 parts of water then was gradually heated to the refluxing temperature and processed in the manner described in Example 1. Infra-red analysis of the resultant product showed it to consist of 44% of the ortho-, 41% of the meta-, and 15% of the para-dichlorobenzene isomers, a yield of meta isomer 4-fold that secured in Example 1 using unpretreated material. This illustrates the beneficial effect upon the conversion to the meta isomer of the pretreatment with anhydrous aluminum chloride in the absence of added water.

Example 3

Redistilled commercial ortho-dichlorobenzene was refluxed for 1 hour with 5% of its weight of concentrated sulfuric acid. It then was cooled, washed successively with water, with 10% aqueous sodium hydroxide solution and again with water, dried over calcium chloride, filtered, and the filtrate distilled under a pressure of 40 millimeters of mercury. The distillate, which boiled at 87° C. under this pressure, showed a 99.9% concentration of ortho isomer by infra-red analysis. A portion of this pretreated material was treated in the manner described in Example 1. The resultant reaction product consisted of a mixture of 61% of the ortho, 30% of the meta, and 9% of the para isomers.

*Example 4*

Six hundred parts of dichlorobenzenes boiling at 110° C. under 100 millimeters of mercury pressure, recovered by fractional distillation under vacuum from the reaction products of runs similar to that of Example 1, and containing approximately 98% of the ortho isomer and 2% of the meta isomer, were mixed with 60 parts of anhydrous aluminum chloride and with 5 parts of water, and the mixture was treated in the manner described in Example 1. The resultant product consisted of 35% of the ortho, 47% of the meta, and 18% of the para isomers of dichlorobenzene. Thus the process increased the meta isomer content over 23-fold.

*Example 5*

A mixture of 600 parts of commercial para-dichlorobenzene, 60 parts of anhydrous aluminum chloride and 5 parts of water was gradually heated during 2.5 hours to the refluxing temperature, about 172° C., and held there for 0.5 hour. The mixture was cooled somewhat, and poured into 1,000 parts of a cold, aqueous solution containing 83 parts of sodium hydroxide. Enough toluene was added to dissolve the solid which crystallized out. The organic layer which separated was isolated, washed with water, dried over calcium chloride, and filtered. The filtrate was fractionally distilled under vacuum, and the fraction distilling at 98° C. to 106° C. under a pressure of 100 millimeters of mercury was separated. It consisted of 558 parts, and analyzed 7% of ortho-, 22% of meta-, and 71% of para-dichlorobenzene.

The effective isomerization to the meta isomer of the ortho- and para-dichlorobenzenes by the process is surprising since it is known that aluminum chloride is a good chlorinating agent for the production of dichlorobenzenes, but that it produces principally the para isomer and only a small amount of the meta isomer. Moreover, of various common Friedel-Crafts type catalysts tested in the process none excepting aluminum chloride was effective.

The invention is susceptible of modification within the scope of the appended claims.

I claim:

1. Process for producing meta-dichlorobenzene, which comprises heating to at least 120° C. and reacting a dichlorobenzene selected from the class consisting of the ortho and para isomers thereof, and mixtures of dichlorobenzenes containing at least one of such isomers, in the presence of aluminum chloride and at least 3% of water, based upon the dry weight of the aluminum chloride, required to form a basic salt with at least some of the aluminum chloride.

2. Process as defined in claim 1 wherein the dichlorobenzene starting material has been purified by treating it with a compound selected from the class consisting of the metal halides of the Friedel-Crafts type and sulfuric acid and distilling the thus treated dichlorobenzene.

3. Process for producing meta-dichlorobenzene, which comprises heating to at least 120° C. and reacting a dichlorobenzene selected from the class consisting of the ortho and para isomers thereof, and mixtures of dichlorobenzenes containing at least one of such isomers, in the presence of aluminum chloride and of between around 3% and around 27% of water, based upon the dry weight of the aluminum chloride, recovering from the resultant reaction products a mixture of the ortho, meta and para isomers of dichlorobenzene enriched in the meta isomer.

4. Process for producing a mixture of dichlorobenzenes enriched in the meta isomer, which comprises heating to a temperature within the range between 120° C. and the refluxing temperature a mixture of at least one dichlorobenzene selected from the class consisting of the ortho and para isomers thereof, and mixtures of dichlorobenzenes containing at least one of such isomers, with at least 2% of aluminum chloride, based upon the dichlorobenzene, and with water added in amount sufficient to form a substantial quantity of a basic aluminum chloride with at least some of the aluminum chloride.

5. Process as defined in claim 4, together with the preliminary step of purifying the dichlorobenzene starting material by heating and reacting it for at least 20 minutes with a compound selected from the class consisting of the metal halides of the Friedel-Crafts type and sulfuric acid, and distilling the thus treated dichlorobenzene.

6. Process as defined in claim 4, together with the preliminary step of heating the dichlorobenzene starting material for at least 20 minutes with a catalyst of the Friedel-Crafts type, and distilling the thus treated dichlorobenzene.

7. Process as defined in claim 4, together with the preliminary step of heating the dichlorobenzene starting material for at least 20 minutes with aluminum chloride, and distilling the thus treated dichlorobenzene.

8. Process as defined in claim 4, together with the preliminary step of heating the dichlorobenzene starting material for at least 20 minutes with concentrated sulfuric acid, and distilling the thus treated dichlorobenzene.

9. Process for producing a mixture of dichlorobenzenes enriched in the meta isomer, which comprises heating to a temperature within the range between 120° C. and the refluxing temperature a mixture of at least one dichlorobenzene selected from the class consisting of the ortho and para isomers thereof and mixtures of dichlorobenzenes containing at least one of such isomers, at least 2% of aluminum chloride, based upon the weight of the dichlorobenzene, and from around 3% to around 27% of water, based upon the dry weight of the aluminum chloride, and recovering from the resultant reaction products a mixture of dichlorobenzenes enriched in the meta isomer.

10. In the process for producing meta-dichlorobenzene, the step which comprises heating to a temperature within the range between 120° C. and the refluxing temperature and thereby isomerizing at least one dichlorobenzene selected from the class consisting of the ortho and para isomers thereof and mixtures of dichlorobenzenes containing at least one of such isomers, in admixture with from around 2% to around 15% of aluminum chloride, based upon the weight of the dichlorobenzene, and with from around 3% to around 27% of water, based upon the dry weight of the aluminum chloride.

11. Process as defined in claim 10 wherein the dichlorobenzene starting material has been treated prior to the isomerization step with a compound selected from the class consisting of the metal halides of the Friedel-Crafts type and sulfuric acid, and the resultant product has been distilled.

12. Process as defined in claim 10, wherein the dichlorobenzene starting material has been treated prior to the isomerization step with aluminum chloride and the resultant product has been distilled.

13. Process as defined in claim 10 wherein the dichlorobenzene starting material has been treated prior to the isomerization step with concentrated sulfuric acid, and the resultant product has been distilled.

14. In the process for producing meta-dichlorobenzene, the step which comprises heating to a temperature within the range between 120° C. and the refluxing temperature and thereby isomerizing to the meta isomer at least one dichlorobenzene selected from the class consisting of the ortho and para isomers thereof and mixtures of dichlorobenzenes containing at least one of such isomers, in admixture with around 10% of aluminum chloride, based upon the weight of the dichlorobenzene and with from around 8% to around 16% of water, based upon the dry weight of the aluminum chloride.

JOHN T. FITZPATRICK.

References Cited in the file of this patent

Friedel et al., "Annales de Chimie et de Physique," Series 6, vol. 10, pages 411–24 (1887).

Leroy, "Bull. Soc. Chim. Paris," Series 2, vol. 48, pages 214–5 (1887).

Holleman et al., "Rev. Trav. Chim. Pays-Bas.," vol. 30, pages 323–8 (1911).

Thomas, "Anhydrous Aluminum Chloride in Organic Chemistry," pages 692–694 (1942).